United States Patent [19]

Cini et al.

[11] Patent Number: 4,725,769
[45] Date of Patent: Feb. 16, 1988

[54] CURRENT LIMITED FOR CONSTANT CURRENT FOR SWITCHING DRIVING DEVICES

[75] Inventors: Carlo Cini, Cornaredo; Claudio Diazzi, Milan; Giuseppe Gattavari, Olgiate Olona, all of Italy

[73] Assignee: SGS Microelettronica S.p.A., Catania, Italy

[21] Appl. No.: 36,518

[22] Filed: Apr. 9, 1987

[30] Foreign Application Priority Data

Apr. 22, 1986 [IT] Italy ................................ 20171 A/86

[51] Int. Cl.⁴ ............................................. G05F 1/573
[52] U.S. Cl. ................................... 323/283; 323/285; 361/18
[58] Field of Search ............... 323/282, 283, 284, 285; 361/18, 87, 93, 100, 101

[56] References Cited

U.S. PATENT DOCUMENTS

| | | | |
|---|---|---|---|
| 3,818,306 | 6/1974 | Marini | 323/283 X |
| 3,970,919 | 7/1976 | Butcher | 323/283 |
| 3,978,393 | 8/1976 | Wisner et al. | 323/283 X |
| 4,309,650 | 1/1982 | Boros et al. | 323/283 |
| 4,438,473 | 3/1984 | Cawley et al. | 361/18 |

OTHER PUBLICATIONS

Faulkenberry, "Low Cost Timers Govern Switched-Mode Regulator", Electronics, vol. 53, No. 27, Dec. 18, 1980, p. 97.

Primary Examiner—Peter S. Wong
Attorney, Agent, or Firm—Guido Modiano; Albert Josif

[57] ABSTRACT

The switching driving device with current limitation, operating reliably even with high switching frequencies, comprises a drive stage receiving at the input a timing clock signal at a preset frequency and generating at the output a drive signal synchronized with the timing clock signal, a power element connected at the input to the drive stage, receiving therefrom the drive signal and generating a load supply signal, a load fed by the power element, and a current sensor generating an overload signal when the current in the load has reached a preset threshold. The current limitation is obtained through a memory element connected to the current sensor and disabling the drive stage in the presence of the overload signal. In order to obtain a reliable operation, in the presence of the overload signal the drive stage is controlled at a switching frequency which is lower than the preset frequency of the timing clock signal.

7 Claims, 4 Drawing Figures

CURRENT LIMITED FOR CONSTANT CURRENT FOR SWITCHING DRIVING DEVICES

BACKGROUND OF THE INVENTION

The present invention relates to a current limiter for switching devices. In particular the invention is applicable to current protection stages of switching power supplies or, more in general, to other switching systems for driving inductive loads.

Devices of this kind generally comprises a drive stage feeding a power transistor which in turn feeds a load which comprises a filter including at least one inductive element. A current sensor system is furthermore connected to the power transistor (of the bipolar or MOS-FET type), to evaluate the current flowing in the load and to send an error signal if said current exceeds a preset threshold.

In order to achieve a current limitation of the output stage with impulse by impulse operation, it is possible to provide a current limiter connected downstream of the sensor and generating a disabling signal for interrupting load feeding following reception of the overload signal supplied by the sensor.

A known circuit which operates in the manner described is indicatively illustrated in FIG. 1, while FIG. 2 depicts a number of waveforms related to different points of the known circuit. In FIG. 1, the reference numeral 10 indicates the drive stage of a known type for a switching power supply, the drive stage feeding the base of a power transistor 11. In the example illustrated, the emitter of the transistor 11 is connected to an output filter circuit, comprising an inductor 12, a capacitor 13, a resistor 14, and a diode 15, while the collector of the transistor 11 is connected to the supply voltage $V_{CC}$ through a control resistor $R_S$ 16, which constitutes a current sensor and generates a voltage signal proportional to the current flowing in the load. This voltage signal is supplied on the input 19 of a comparator 17, the other input of which (indicated with the reference numeral 18) is connected to a reference voltage, here the power supply voltage. The output 20 of the comparator is supplied to an input 22 of a bistable memory element 21 (here a flip-flop of the set-reset type) to the reset type 23 of which is applied a main clock signal MC1 which constitutes the general switching frequency of the system. The main output Q, 24 of the memory element 21 is then sent to an enabling input of the drive stage 10 so as to inhibit its operation upon receiving an overload signal from the sensor circuit and to re-enable the drive stage 10 upon the reception of the impulses of the main clock signal on the input 23. For the sake of greater clarity, FIG. 2 illustrates waveforms related to points of the circuit of FIG. 1. In particular, FIG. 2a illustrates the main clock signal applied to the reset input of the flip-flop 21, FIG. 2b illustrates the current flowing through the transistor 11 and indicated with $I_{TR}$, while FIG. 2c illustrates the load current $I_L$. As can be seen, after the arrival of a reset impulse through the input 23 and the output 24 (with a slight delay due to he propagation times of the current $I_{TR}$ towards the load. When this current, which has a very short rise time, reaches the desired limit threshold value $I_M$, the voltage values on the inputs 18 and 19 of the comparator 17 will be such as to generate a switching off signal on the output 20, which signal is then fed on the set input of the flip-flop 21, causing the latter to switch. Then the flip-flop 21 generates an inhibiting signal on the output 24 which switches off the drive signal 10 and the transistor 11 until the arrival of the successive impulse of the main clock on the reset input 23. As a consequence, the flip-flop 21 switches again, supplying the stage 10 with an enable signal and allowing therefore load feeding. In practice, the load will show the current behaviour illustrated in FIG. 2c by virtue of the action of the filter components 12, 13 which maintain an average current and voltage value on the load. In practice, the device, when in overload conditions, acts as a current source.

However, the circuit described, which in all other ways operates reliably, is characterized by inadequate functioning due to the delay times related to the propagation of the signals from the sensor stage to the actuator stage. Indeed, it is intuitively understood that if the propagation delay of the overload signal if percentually high with respect to the period of the main clock signal, there will not be an adequate current limitation. In particular, the propagation delay determines the minimum duration of the current impulse which the system is capable of adjusting when in protection mode. This delay time is all the more critical as the switching frequency or clock frequency of the circuit is high, since, in order to determine the output current, the duty cycle, i.e. the ratio between the switching-on time $T_{ON}$ of the transistor and the period T of the main clock, is fundamental.

SUMMARY OF THE INVENTION

Given this situation, the main aim of the present invention is to provide a current limiter operating at constant current for switching driving devices, in particular switching power supplies, capable of eliminating the disadvantages of the prior art.

Within the scope of this aim, a particular object of the present invention is to provide a current limiter which operates reliably even with relatively high propagation times of the overload signal, and even with a very high main clock signal frequency.

A further object of the invention is to provide a current limiter which is of simple structure, employing circuit elements which are currently known and available on the market, with low production costs, or which can be provided in an integrated form.

The aim described, the objects mentioned and others which will become apparent hereinafter, are achieved by a current limiter for switching devices including a drive stage receiving at the input a timing clock signal having a preset frequency and generating at the output a drive signal, a power element connected at the input to said drive stage and receiving therefrom said drive signal for generating a load supply signal, a load connected to said power element and receiving therefrom said load supply signal, and a current sensor connected to said power element for comparing said load supply signal with a preset threshold and for generating an overload signal when said load supply signal is at least equal to said preset threshold, said limiter comprising disabling means connected to said current sensor and said drive stage for generating a disabling signal fed to said drive stage upon reception of said overload signal, wherein said current limiter further comprises clock means connected to said drive stage and generating a reset clock signal having a lower frequency than said timing clock signal for resetting said disabling means at said lower frequency.

BRIEF DESCRIPTION OF THE DRAWINGS

Further characteristics and advantages of the invention will become apparent from the description of a preferred, but not exclusive, embodiment, illustrated only by way of non-limitative example in the accompanying drawings, where.

DESCRIPTION OF THE PREFERRED EMBODIMENTS

Figure 1:
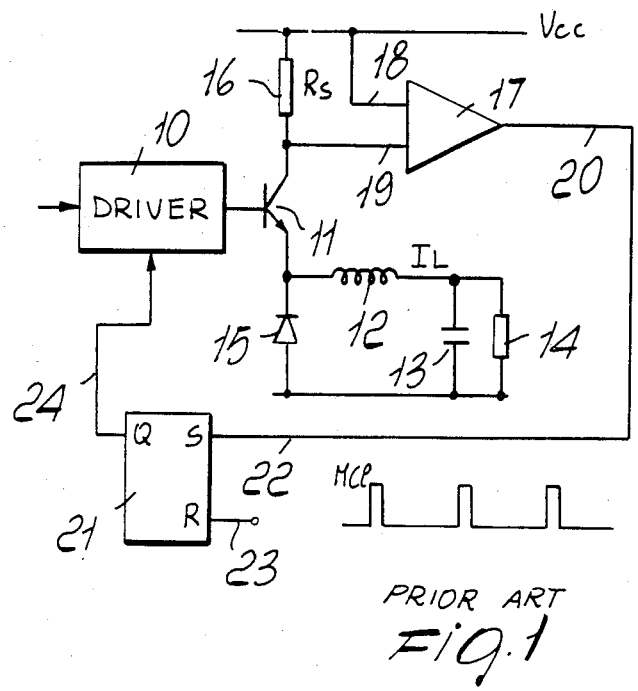
FIG. 1 is the circuit diagram of a switching power supply with current limiter of a known type.
Figure 2:
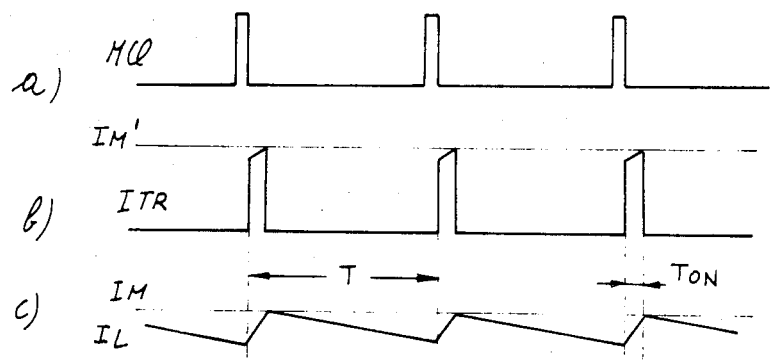
FIG. 2 illustrates the waveform of three signals taken in suitable points of the circuit of FIG. 1.

Hereinafter, the description of FIGS. 1 and 2, for which reference should be made to the previous description, is omitted.

Figure 3:
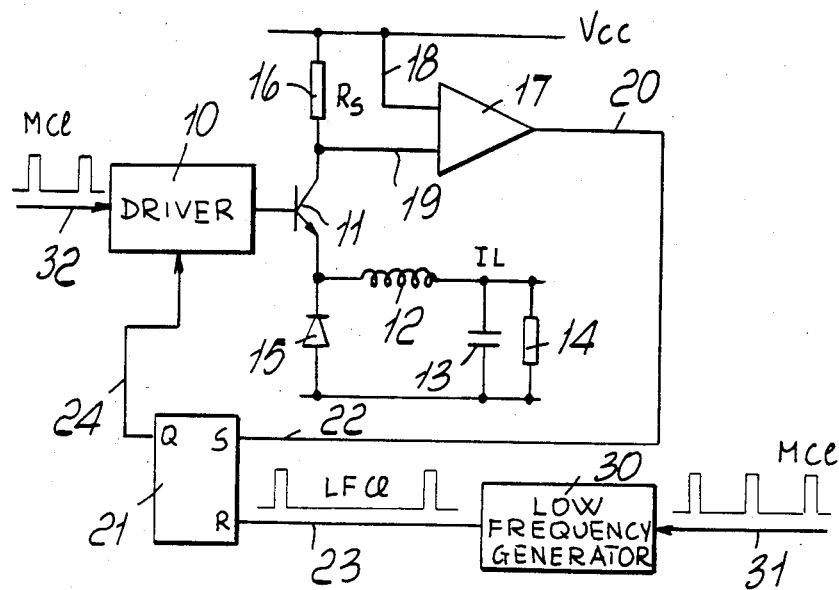
FIG. 3 is a view of a switching power supply with the current limiter according to the present invention.

FIG. 3 schematically illustrates a switching power supply of a known kind, to which the current limiter according to the present invention is connected. In particular, the components of the known switching power supply are the same of FIG. 1 and have been indicated with the same reference numerals. In detail, the drive stage 10, the power transistor 11, the load filter circuit comprising the inductor 12, the capacitor 13, the resistor 14 and the diode 15, have been shown. The transistor 11 is connected, also in this case, to a current sensor comprising the resistor 16 and the comparator 17 for generating an overload signal on the output 20. The current limiter then comprises a bistable memory element 21 connected in a known manner at the set input 22 to the comparator output 20 and at the reset input 23 to a low-frequency generator 30. This generator 30, which can be implemented by a low-frequency oscillator or by means of a frequency divider, receives the main clock signal MC1 at the input 31 and generates at the output a reset clock signal LFC1 synchronized with the main clock. The output 24 of the bistable memory element of flip-flop 21 is sent to the drive stage 10 which also receives the main clock signal MC1 on the input 32.

Figure 4:
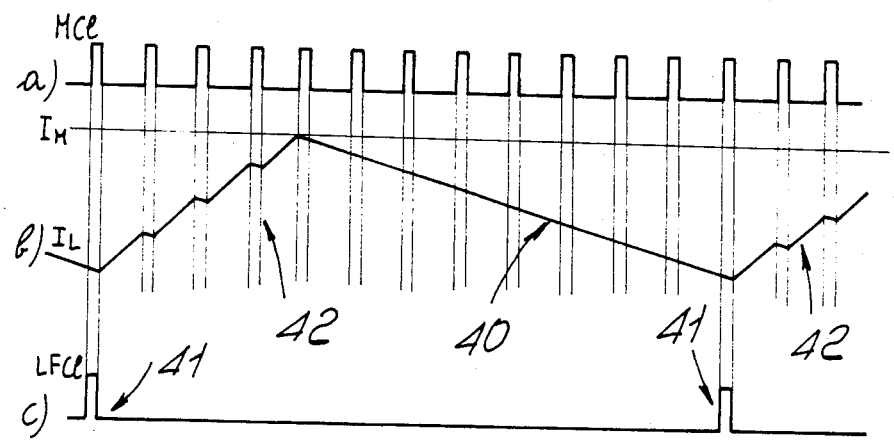
FIG. 4 illustrates the waveform of signals taken from suitable points of the circuit of FIG. 3.

The operation of the circuit of FIG. 3 is as follows. In normal conditions without overload at the input 22 of the flip-flop 21 no overload input is present (e.g. the signal at input 22 is low) and the output 24 of said memory element is such as to allow the normal operation of the driving stage 10 (e.g. the output 24 is also low). Accordingly, the drive stage 10 can operate in a known manner at the main switching frequency (e.g. 500 KHz) supplied on the input 32. During this phase, therefore, the current on the load is constant with ripple at the frequency of MC1. As soon as the current $I_L$ on the load reaches the preset maximum allowable value $I_M$, the comparator 17 switches and sends a set signal (e.g. a high signal) on the input 22 of the flip-flop 21, which signal in turn causes the switching of the memory element. Accordingly, an inhibiting signal (e.g. a high signal) is generated on the output 24 and is fed to the drive stage 10 which is thus disabled and no longer drives the transistor 11 at the main switching frequency. During this phase, the current on the load decreases with continuity, as can be seen in FIG. 4b in the falling portion of the line indicated with 40. As soon as the impulse from the low-frequency oscillator 30 (impulse 41 in FIG. 4c) reaches the input 23 of the flip-flop 21, the latter switches and sends an enable signal (e.g. a low signal) to the output 24, by virtue of which the drive stage 10 is allowed to operate at the main switching frequency supplied thereto at the input 32. Since, during the switching off phase of the drive stage, the current on the load has significantly decreased, the circuit will require some periods of the main clock before the current on the load reaches once more the maximum value $I_M$, as indicated in FIG. 4c by the line 42. Thereafter, the operation as described is repeated.

In practice, as can be seen, during the normal operating phase (i.e. with the current in the load lower than the preset threshold value) the drive stage 10 and the related power transistor 11 operate at high frequency, while when the preset current threshold is reached, the driving stage 10 and the related transistor 11 are controlled by the lower-frequency signal (e.g., 50 KHz) synchronized with the high-frequency main clock signal (e.g. 500 KHz).

In this manner, it is ensured that, even in the case of high delay times between the moment in which the allowable current value is reached, as detected by the sensor 16,17, and the moment in which switching off of the driving stage occurs, there is adequate and reliable current limiting, even in the case of a high frequency of the main clock signal. This fact allows design of driving devices which operate at very high switching frequencies, with the known advantages in terms of the dimensions of the filter components.

Therefore, the limiting device according to the invention reliably operates regardless of the main clock frequency, even with relatively high overload signal delay times.

Futhermore, the device is capable of reliably opeating even if the main clock frequency is lower than the reset frequency generated by the low-frequency oscillator. Indeed, in this cas, since the low-frequency clock is synchronized with the main clock, the low-frequency signal outputted by the oscillator 30 and supplied on the reset input of the flip-flop 21 coincides with the main clock signal (i.e., with the signal with the lowest frequency). This ensures that even when the system is caused to work at low frequency (lower than that of the own frequency of the oscillator), this low frequency remains constant even in short circuit and overload conditions and does not increase.

The invention thus conceived is susceptible to numerous modifications and variations, all of which are within the scope of the inventive concept. In particular, the fact is stressed that the embodiment described is only an example, and that the same inventive concept can be embodied in a plurality of manners, e.g. by providing a switch controlled by the overload signal supplied by the current sensor and connected on one side to the enable input of the driving stage and on the other selectively to one of the two clock signals with different frequencies. Furthermore, in the embodiment illustrated, the generator 30 can be replaced either by a low-frequency oscillator controlled by the main clock signal or even by a frequency divider.

Moreover, all the details may be replaced with technically equivalent elements.

We claim:

1. Current limiter for switching devices including a drive stage receiving at its input a timing clock signal having a preset frequency and generating at the output a drive signal, a power element connected at its input to said drive stage and receiving therefrom said drive signal for generating a load supply signal, a load connected to said power element and receiving therefrom said load supply signal, and a current sensor connected to said power element for comparing said load supply signal with a preset threshold and for generating an overload signal when said load supply signal is at least equal to said preset threshold, said limiter comprising disabling means connected to said current sensor and said drive stage for generating a disabling signal fed to said drive stage upon reception of said overload signal, wherein said current limiter further comprises clock means connected to said drive stage and generating a reset clock signal having a lower frequency than said timing clock signal for resetting said disabling means at said lower frequency.

2. Current limiter according to claim 1, wherein said lower frequency is a sub-multiple of said preset frequency of said timing clock signal and is synchronized therewith.

3. Current limiter according to claim 1, wherein said disabling means comprise a bistable memory element which receives at one input said overload signal and at a further input said reset clock signal, and connected at its output to said drive stage for generating said disabling signal upon reception of said overload signal and resetting operation of said drive stage upon reception of a pulse of said reset clock signal.

4. Current limiter, according to claim 1, wherein said reset clock signal is in phase with said timing clock signal.

5. Current limiter, according to claim 1, further comprising a low-frequency oscillator receiving at its input said timing clock signal and generating at its output said reset clock signal.

6. Current limiter, according to claim 1, further comprising a frequency divider receiving at its input said timing clock signal and generating at its output said reset clock signal.

7. Switching device, in particular switching power supply with output current limiting, comprising a drive stage receiving at its input a timing clock signal having a preset frequency and generating at its output a drive signal, a power element connected at its input to said drive stage and receiving therefrom said drive signal for generating a load supply signal, a load connected to said power element and receiving therefrom said load supply signal, a current sensor connected to said power element for comparing said load supply signal with a preset threshold and for generating an overload signal when said load supply signal is at least equal to said preset threshold, and a current limiter including disabling mean connected to said current sensor and said drive stage for generating a disabling signal fed to said drive stage upon reception of said overload signal characterized in that said current limiter comprises clock means connected to said drive stage and generating a reset clock signal having a lower frequency than said timing clock signal for resetting said disabling means at said lower frequency and allowing operation of said drive stage.

* * * * *